Nov. 16, 1926.
Re. 16,479
P. BENJAMIN ET AL
WATERPROOF RECEPTACLE
Original Filed July 29, 1925
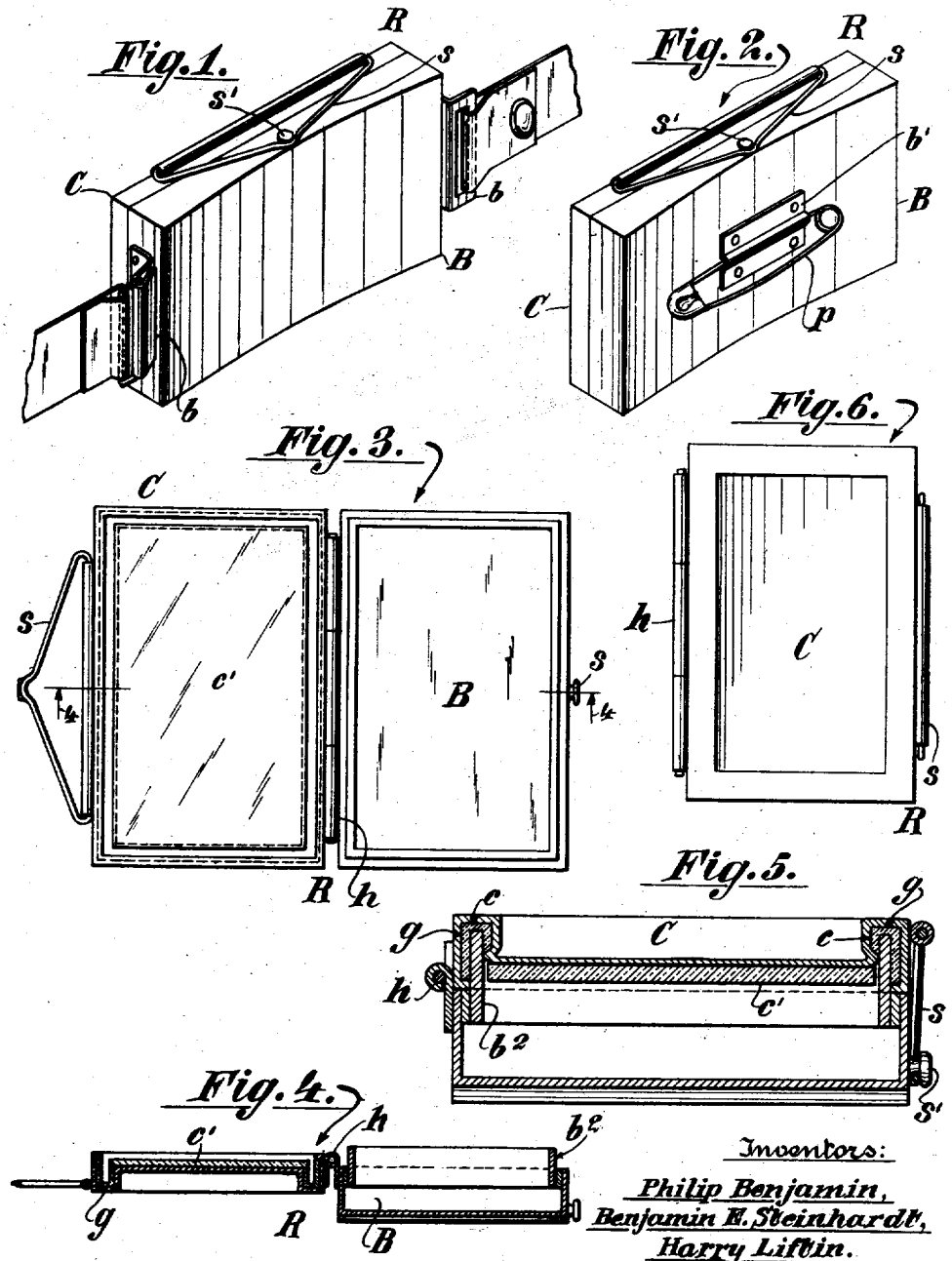
Inventors:
Philip Benjamin,
Benjamin E. Steinhardt,
Harry Liftin.
By their Attorney, Geo. H. Mitchell Reissued Nov. 16, 1926. Re. 16,479

UNITED STATES PATENT OFFICE.

PHILIP BENJAMIN, OF NEW YORK, N. Y.; BENJAMIN E. STEINHARDT, OF JERSEY CITY, NEW JERSEY; AND HARRY LIFTIN, OF NEW YORK, N. Y.

WATERPROOF RECEPTACLE.

Original No. 1,575,524, dated March 2, 1926, Serial No. 46,753, filed July 29, 1925. Application for reissue filed May 11, 1926. Serial No. 108,408.

Our improvements relate to the class of waterproof receptacles, designed for individual use, and to be carried upon the person, especially for the convenience of bathers and others exposed to contact with water or excess of moisture,—the object being to afford a suitable container for personal effects, as money, jewelry, keys, etc., in fact for any article or articles of relatively small size which it is desired to retain in safety in direct possession and control of the owner or user, as the case may be, at the same time insuring the integrity of the contained articles and protecting them effectually against the deteriorating effects of moisture; and to this end our invention consisting in the specific construction, combination and arrangement of parts and appurtenances herein described and claimed, distinctive features relating to the sealing and locking means, the adapting of our device for use as a vanity case, purse, cigarette holder, and for analogous purposes, all as hereinafter fully set forth.

In the accompanying drawings we illustrate a practical embodiment of the essential features of our invention in a waterproof receptacle of the character designated of quadrilateral shape, although we do not limit ourselves to the identical configuration or construction of the component parts of the device shown by way of exemplification, since changes may be made in minor details, and equivalent mechanical expedients resorted to, with like results, and without departing from the spirit and intent of our invention in this respect.

With this understanding:—

Fig. 1, represents a perspective view of our waterproof receptacle, closed, and adapted for attachment to a body belt or equivalent supporting means;

Fig. 2, is a similar perspective view showing the device as adapted to be attached to the clothing of the user, by means of a safety pin, so called;

Fig. 3, is a top view or plan of our waterproof receptacle as opened up and extended horizontally;

Fig. 4, is a transverse sectional elevation taken upon plane of line 4—4, Fig. 3;

Fig. 5, is a transverse sectional elevation, upon an enlarged scale for clearness of illustration, of our waterproof receptacle as closed and taken approximately on the plane of line 4—4, Fig. 3;

Fig. 6, is an elevation of the frontal or cover side of the receptacle, closed.

The rear side of what may be designated as the basis or box section B, of our waterproof receptacle R, as considered in a unitary sense, is longitudinally concave as indicated in Figs. 1 and 2, to conform to the body of the wearer, said box section B, being also provided with means for attachment to the person, as for instance with belt lugs *b*, *b*, shown in Fig. 1, or with a loop plate *b'*, for engagement with a safety pin *p*, as in Fig. 2.

The cover section C, is articularly connected with the box section B, as by a hinge *h*, or equivalent mechanical expedient; and suitable provision is made for securing the two said parts together in closed relationship, as by means of an elastic resilient spring yoke *s*, hinged to one section and adapted for contactual engagement with a lock stud *s'*, on the other section, as illustrated in Figs. 1 and 2, of the drawings, it being obvious that an alternative arrangement of such locking parts from that shown may be resorted to if desired with like effect. In fact, in this connection, we do not wish to restrict ourselves to any specific locking means, the essential feature in this respect being the provision of detachable means for securing the two sections B, and C, in closed relationship.

In order to insure a water and moisture proof seal between the box B, and its cover C, when closed, a packing gasket *g*, of elastic resilient material, as rubber or equivalent is interposed between them, being installed on the inner side of the cover C, for engagement with a straight circumscribing sealing flange $b^2$, positioned upon and protuberant beyond the edge of the box section B, as shown more particularly in the enlarged sectional view, Fig. 5, of the drawings, to which reference may be had for a clear understanding of the construction and arrangement of parts involved, by which it will be seen that the said protuberant straight sealing flange $b^2$, is spaced inward apart from the edge of the basic box section B, by means of a circumscribing supporting shoulder interposed between the lower part of said sealing flange $b^2$, and the adjacent inner side of said box section B.

In order to secure and support the gasket $g$, firmly in position the edges of the cover C, are inturned to form a receptive groove $c$, of substantially inverted L form, that being the shape of the rectangular gasket $g$, in cross section, thus forming a seat for the box flange $b^2$, which contacts therewith at the extreme outer edge and both sides thereof, as clearly shown in the aforesaid Fig. 5, of the drawings. As a result, when the cover C, is closed and pressed down upon the box B, and secured thereto by the elastic clamp $s$, a perfect moisture proof seal is attained which effectually protects the interior and contents of the receptacle against loss, injury, or contamination.

Rigidly secured to the inner side of the cover C, by cement or otherwise, is a mirror $c'$, thus adapting the device for use as a vanity case, so called, if desired, although this is only an incidental feature of our invention, since our waterproof receptacle is adapted to various other purposes, as for instance, the temporary storage upon the person of money, jewelry, keys, cigarettes, and other individual property, as may be found expedient under varying circumstances and conditions of use.

What we claim as our invention and desire to secure by Letters Patent, is:—

1. As an article of manufacture, an elongate rectangular waterproof receptacle of the character designated, comprising a basic box section formed with a protuberant circumscribing sealing flange, a cover section hinged to said basic box section and formed with an inturned flange shaped to constitute a receptive inverted L-shaped groove with retaining flanges for the reception and support of a circumscribing gasket which is L-shaped in cross section, said gasket being of elastic resilient material for embracing engagement with said protuberant sealing flange on the basic box section, and means for securing said cover and basic box section in closed relationship, substantially in the manner and for the purpose set forth.

2. As an article of manufacture, an elongate rectangular waterproof receptacle of the character designated, comprising a basic box section having an externally concave back side, and means for attachment to the person of the wearer, said basic box section being formed with a protuberant circumscribing sealing flange, a cover section hinged to said basic box section and formed with an inturned flange shaped to constitute a receptive inverted L-shaped groove with retaining flanges for the reception and support of a circumscribing gasket which is L-shaped in cross section, said gasket being of elastic resilient material for embracing engagement with said protuberant sealing flange on the basic box section, and means for securing said cover and basic box section in closed relationship, substantially in the manner and for the purpose set forth.

3. As an article of manufacture, an elongate rectangular water proof receptacle of the character designated, comprising a basic section having an externally concave back side and means for attachment to the person of the wearer, said basic box section being formed with a protuberant circumscribing sealing flange which is straight in transverse section and which is spaced inward apart from the edge of said basic section by means of an annular supporting shoulder, said annular supporting shoulder integrally uniting said sealing flange and said edges of the basic box section, a cover section hinged to said basic box section and fitting flush with the edge thereof when closed, said cover section being formed with an inturned flange fitting over said spaced apart sealing flange and shaped to constitute a receptive inverted groove with retaining shoulders for the support of a circumscribing gasket of elastic resilient material for contactual engagement with said sealing flange on the basic box section, and means for securing said cover and basic box section in closed relationship, substantially in the manner and for the purpose set forth.

PHILIP BENJAMIN.
BENJAMIN E. STEINHARDT.
HARRY LIFTIN.